(12) United States Patent
Zemyan et al.

(10) Patent No.: US 6,378,668 B1
(45) Date of Patent: Apr. 30, 2002

(54) SPRING APPLIED PARKING BRAKE ASSEMBLY HAVING A MANUAL QUICK RELEASE FEATURE

(75) Inventors: James M. Zemyan, Wilmerding; Roger V. Lewis, North Huntingdon, both of PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/511,164

(22) Filed: Feb. 24, 2000

(51) Int. Cl.[7] .............................................. F16D 65/24
(52) U.S. Cl. .......................... 188/170; 188/3 R; 188/33; 188/153 R
(58) Field of Search ............................ 303/7; 188/170, 188/166, 167, 3 R, 33

(56) References Cited

U.S. PATENT DOCUMENTS

| | | | | |
|---|---|---|---|---|
| 2,673,483 A | * | 3/1954 | Bird ............................ | 188/170 |
| 3,020,094 A | * | 2/1962 | Murty et al. ................. | 188/170 |
| 3,028,842 A | * | 4/1962 | Dobrikin et al. ............. | 188/170 |
| 3,272,566 A | * | 9/1966 | Clack .......................... | 188/170 |
| 3,557,665 A | * | 1/1971 | Lewis .......................... | 188/170 |
| 3,799,297 A | * | 3/1974 | Ryburn et al. ............... | 188/170 |
| 3,977,304 A | * | 8/1976 | Meissner ..................... | 188/170 |
| 4,116,113 A | * | 9/1978 | Leclerc ........................ | 188/170 |
| 4,364,305 A | * | 12/1982 | Dalibout et al. ............. | 188/170 |
| 5,033,592 A | * | 7/1991 | Metzelfeld ................... | 188/170 |
| 5,069,312 A | * | 12/1991 | Kanjo et al. ................. | 188/52 |
| 5,601,162 A | * | 2/1997 | Heimann ..................... | 188/170 |
| 5,704,273 A | * | 1/1998 | Reeder et al. ............... | 188/170 |
| 5,816,371 A | * | 10/1998 | Buckley et al. ............. | 188/170 |
| 5,937,974 A | * | 8/1999 | Cathcart et al. ............. | 188/170 |

* cited by examiner

Primary Examiner—Robert Oberleitner
Assistant Examiner—Devon Kramer
(74) Attorney, Agent, or Firm—James Ray & Associates

(57) ABSTRACT

A spring applied parking brake assembly for a railroad vehicle braking system is provided for an automatic application of the parking brake in the absence of an air source. The spring applied parking brake assembly comprises a cylindrical casing containing a piston assembly. The piston assembly is mounted for longitudinal movement within the casing upon the application and/or removal of pneumatic pressure to the piston assembly. The piston assembly is associated with a force transfer lever of the braking system so as to apply a force to this force transfer lever upon longitudinal movement of the piston assembly. At least one spring member is provided within the cylindrical casing. This spring member applies a constant force to the piston assembly such that longitudinal movement of the piston assembly automatically occurs upon removal of pneumatic pressure to the braking system, causing the piston assembly to retract within the casing and the force transfer lever to rotate in a direction to initiate a brake application. Thus, once the train is removed from the train consist and the air supply for the pneumatic braking system has been disconnected, the brakes of the train are automatically applied. A manual quick release system is also provided which allows the parking brake to be released during shunting operations or anytime that it is desirable to move the vehicle in the absence of air.

17 Claims, 5 Drawing Sheets

SPRING APPLIED PARKING BRAKE ASSEMBLY HAVING A MANUAL QUICK RELEASE FEATURE

FIELD OF THE INVENTION

The present invention relates, in general, to a parking brake assembly for a railway vehicle braking system and, more particularly, to a spring applied parking brake assembly for a railroad vehicle braking system which is activated by the absence of air in the railway vehicle braking system. The spring applied parking brake assembly of the invention is applicable to both truck and car mounted brake assemblies.

BACKGROUND OF THE INVENTION

As is generally well known in the railway industry, when railway cars are taken out of a train and parked at a siding or yard, the hand brake or parking brake on at least some of these cars is applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car.

As illustrated in FIG. 4, in truck mounted braking systems, the hand brake mechanism is usually either a cast or stamped metal gear housing usually attached to an outside end wall of the railway car and having a rotatable chain drum therein which can be rotated by turning the hand wheel to wind a brake chain onto the chain drum. The other end of the brake chain normally extends through the bottom of the gear housing and is interconnected with cable or other linkage, such as a hand brake lever, to the brake beam which carries the brake shoes such that winding of the brake chain onto the chain drum will apply tension to the brake chain and linkage as necessary to draw the interconnected brake shoes against the tread surfaces of adjacent railway car wheels and, accordingly, apply the hand brake as intended.

A disadvantage of this prior art type hand brake arrangement is that an operator must manually apply the parking brake to each car which requires a considerable amount of time and labor. Additionally, the operator must be certain that the handwheel is turned a sufficient amount to ensure that the parking brake is engaged. Also, the possibility exists that the operator may forget to apply the brake altogether, which could result in unexpected movement of the car while parked at the siding or yard. Furthermore, operation of the handwheel requires exerting a considerable amount of physical force from an awkward position. This, in turn, makes the hand brake difficult to apply.

SUMMARY OF THE INVENTION

Briefly, the invention comprises a cylindrical casing which is engaged with a railroad vehicle braking system. A piston assembly, including a piston and a piston rod, is provided within the cylindrical casing. This piston assembly is mounted for longitudinal movement within the casing upon the application and/or removal of pneumatic pressure to the piston assembly. An attachment means is disposed on the piston rod for associating the piston assembly with the non-cylinder force transfer lever of the braking system so as to apply a force to this non-cylinder force transfer lever upon longitudinal movement of the piston assembly. At least one spring member, preferably two spring members, are provided within the cylindrical casing. These spring members have a first end which abuts against an end wall of the cylindrical casing and a second end which contacts the piston and applies a force to the piston assembly to achieve longitudinal movement of the piston assembly upon removal of pneumatic pressure to the braking system and the piston assembly. This constantly applied force from the spring members causes the piston assembly to retract within the casing and the force transfer lever to rotate in a counterclockwise direction to cause an application of the brakes to the braking system. Thus, once the train is removed from the train consist and the air supply for the pneumatic braking system has been disconnected, the brakes of the train are automatically applied.

At least one opening is provided within the cylindrical casing to enable the application of pneumatic pressure to the piston assembly to cause this piston assembly to move in a longitudinal direction to compress the springs and to drive the piston rod out of the cylindrical casing to cause the non-cylinder force transfer lever to rotate in a counterclockwise direction to cause a release of the brakes.

The spring applied parking brake of the invention also includes a manual quick release system which allows the parking brake to be released during shunting operations or anytime that it is desirable to move the vehicle when no air is present. This manual quick release system comprises a half moon shaped cam operating in a "keyhole" shaped slot. The half moon cam lies crosswise in the circular end of the keyhole during normal operations. A handle attached to the cam is manually operated to effect a quick release by rotating the cam so that the cam aligns with the elongated portion of the keyhole shaped slot. The force of the springs within the spring applied parking brake draws the cam into the slot in a first direction to effectively release the force applied by the spring applied parking brake on the non-cylinder force transfer lever and consequently causes a release of the parking brake.

The spring applied parking brake will remain in a released position, with the quick release handle pulled out, until a normal air pressure actuated brake release is make. When this occurs, the piston and rod assembly will move to compress the springs and move the cam forward, or in a second direction, in the slot. As the cam enters the circular end of the keyhole, a torsion spring on the cam shaft will rotate the cam so that it again lies crosswise in the keyhole. As this occurs the handle rotates clockwise and impacts a striker plate attached to the front of the parking brake unit. The spring applied parking brake is now reset for normal operation.

OBJECTS OF THE INVENTION

It is an object of the present invention to provide a spring applied parking brake assembly for a railway vehicle braking system which is an ergonomic alternative to the currently used manually activated hand brake assemblies.

Another object of the present invention is to provide a spring applied parking brake assembly for a railway vehicle braking system which is particularly applicable to TMX® truck mounted braking systems (TMX® is a registered trademark to Westinghouse Airbrake Company, the assignee of the present invention).

Still another object of the present invention is to provide a spring applied parking brake assembly for a railway vehicle braking system which may be used to replace the currently used manually activated handwheel hand brakes.

A further object of the present invention is to provide a spring applied parking brake assembly for a railway vehicle braking system which is activated by the absence of air in the braking system ensuring that the parking brake is activated as soon as the car has been removed from the air braking system of the train thus providing a significant reduction in time and labor.

Yet another object of the present invention is to provide a spring applied parking brake assembly for a railway vehicle braking system which is automatically activated upon the removal of the car from the air braking system of the train, eliminating the possibility of operator error and/or injury during application of the parking brake.

An additional object of the present invention is to provide a manual quick release lever arrangement to enable a quick release of the spring applied parking brake of the invention during shunting operations or anytime it is desirous to move the vehicle when in the absence of air from the pneumatic braking system.

Although a number of objects and advantages of the present invention have been described in some detail above, various additional objects and advantages of the spring applied parking brake assembly of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF THE INVENTION

Figure 1:
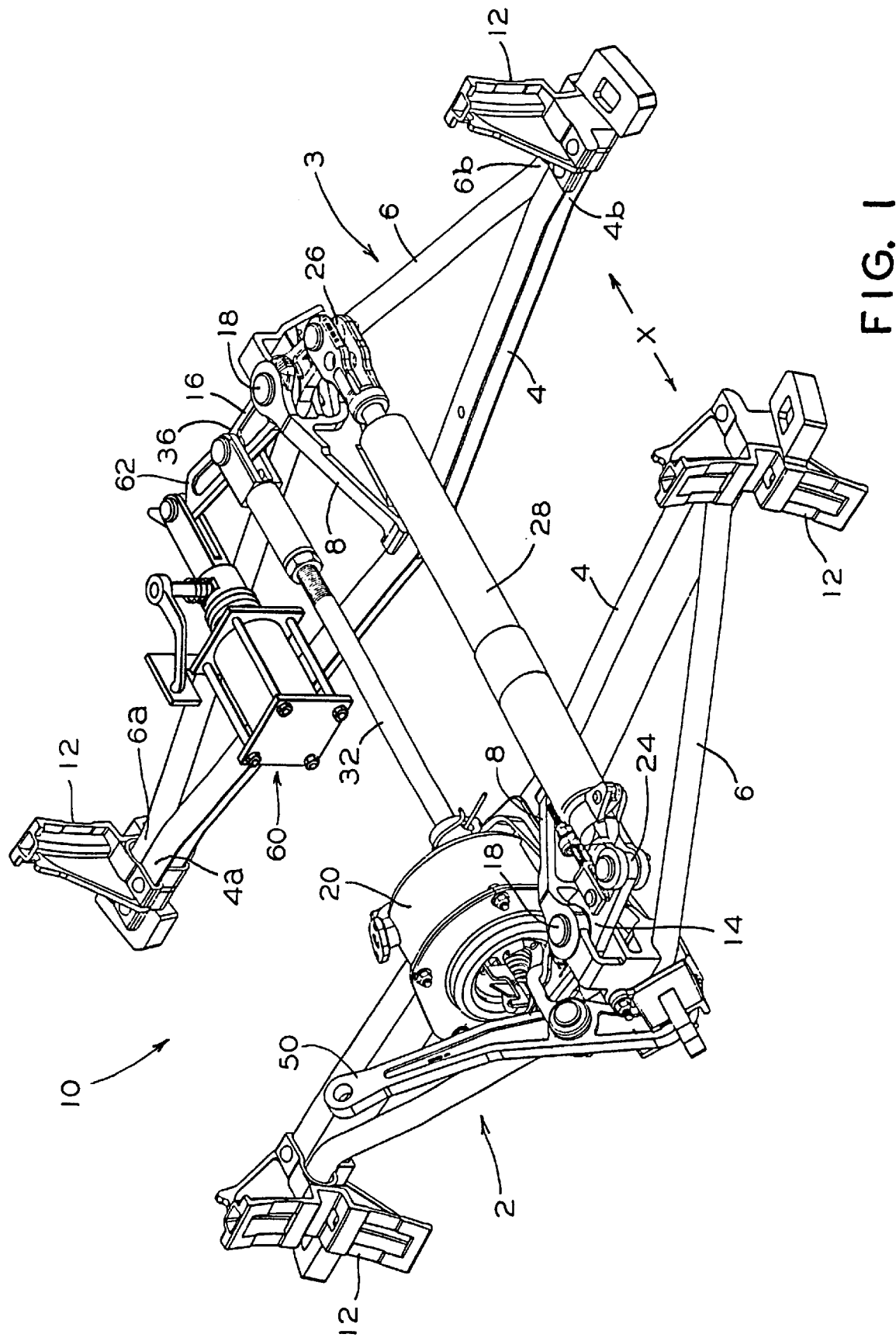
FIG. 1 is a plan view which shows a TMX® truck-mounted brake assembly including the spring applied parking brake of the invention.

Prior to proceeding with the more detailed description of the present invention, it should be noted that for the sake of clarity, identical components which have identical functions have been identified with identical reference numerals throughout the several views illustrated in the attached drawing figures.

Referring now to FIG. 1, there is a presently preferred embodiment of a truck-mounted brake assembly, generally designated 10, for a railway car (not shown) including a conventional type hand brake lever 50. This brake assembly 10 comprises brake beams, generally designated 2 and 3, which are substantially identical. Each of the brake beams 2 and 3 includes a compression member 4, a tension member 6, and a strut member 8. The opposite ends of the compression member 4 and the tension member 6 may be permanently connected together, preferably by welding along an outer segment 4a–6a, 4b–6b at the opposite ends of the compression member 4 and the tension member 6. At a location substantially midway between their opposite ends, the compression member 4 and the tension member 6 of the respective beams 2 and 3 are spaced apart sufficiently to allow connection of the strut member 8 therebetween. Mounted on the respective outer end segments 4a–6a and 4b–6b of the brake beams 2 and 3 are brake heads 12.

A cylinder force-transfer lever 14 and a non-cylinder force transfer lever 16 are pivotally connected by pins 18 to the strut member 8 of the respective brake beams 2 and 3. Each end 24 and 26 of the respective force-transfer levers 14 and 16 is interconnected via a force-transmitting member 28, which may be in the form of an automatic slack adjuster device. The opposite end 36 of the non-cylinder force-transfer lever 16 is connected to a force-transmitting member or return push rod assembly 32.

The brake cylinder assembly 20 is connected to both the strut member 8, adjacent one side thereof, and the compression member 4 in the space between the compression member 4 and the tension member 6. In this arrangement, the weight of the brake cylinder assembly and the force-transmitting members is thus carried by the brake beams 2 and 3, which are, in turn, supported by the truck side frames (not shown).

When a brake application is made, pressurization of the brake cylinder assembly 20 results in the application of a force being applied to the cylinder force-transfer lever 14 causing the cylinder force-transfer lever 14 to rotate in a counter-clockwise direction. The cylinder force-transfer lever 14, in turn actuates the slack adjuster assembly 28 to effect counterclockwise rotation of the non-cylinder force-transfer lever 16 and consequent actuation of the return push rod assembly 32.

The force-transfer levers 14 and 16, along with the slack adjuster assembly 28, the return push rod assembly 32, and the brake cylinder assembly 20 comprise a brake beam actuating linkage that interconnects the, respective, brake beams 2 and 3 via pivot pins 18 and thus the required brake actuation forces effectively act along these pins 18. The resultant of these forces is shown at X. Because the slack adjuster assembly 28 acts as a rigid member during a brake application, it is important that the length of the slack adjuster assembly 28 be allowed to increase with brake shoe wear and/or loss of a brake shoe during service so that movement of the brake cylinder piston assembly will enable such brake beams 2 and 3 to be moved apart by the brake beams linkage until brake shoe engagement with the tread surface of the vehicle wheels occurs.

During a parking situation when the railway cars are taken out of the train and parked at a siding or yard, the pneumatic braking system, as described above, can no longer be used. Thus, in order to apply the brake as a precaution against unwanted or unexpected movement of the cars, a hand brake mechanism, which is mounted on each car, can be employed.

Figure 4:
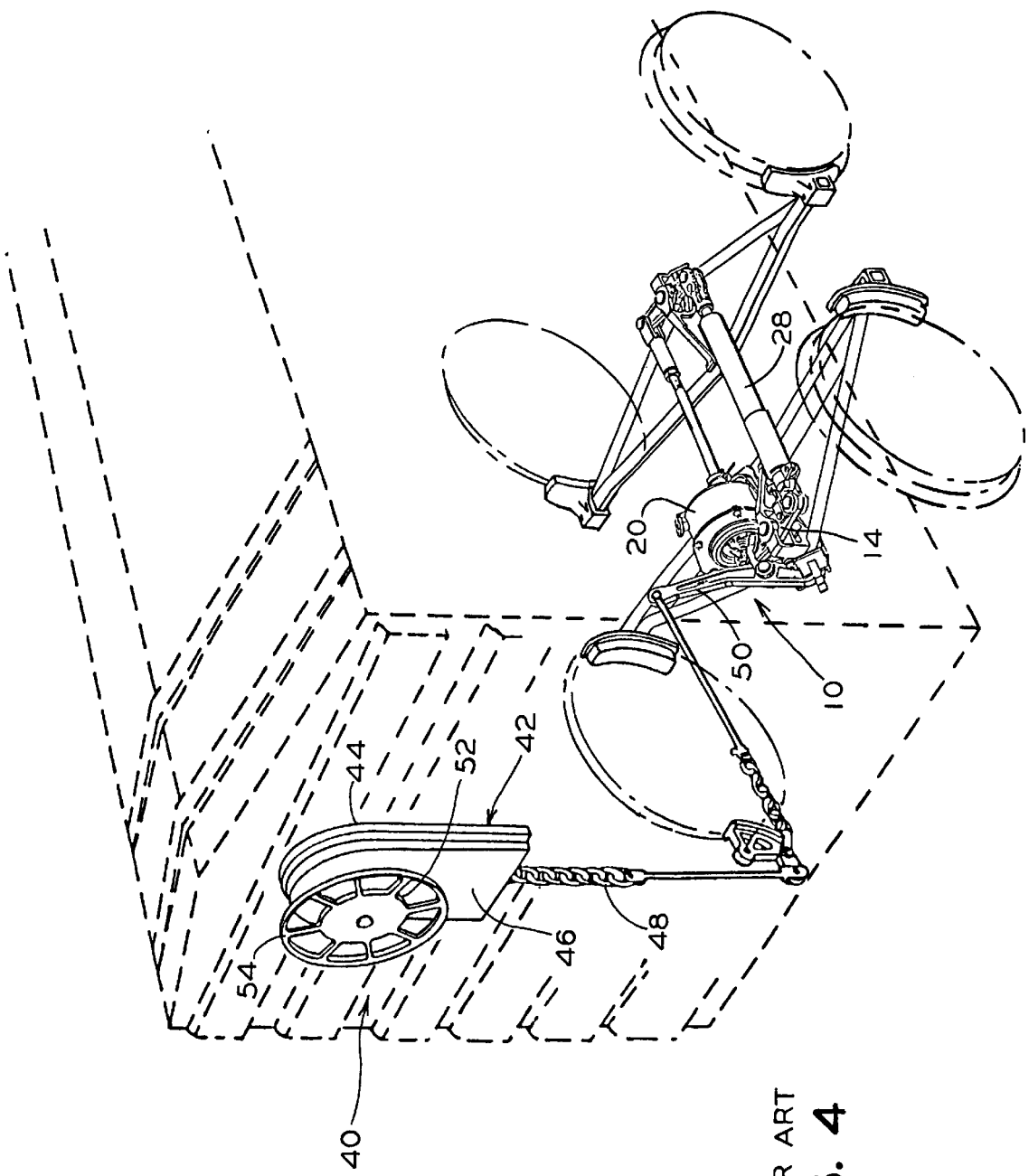
FIG. 4 is a plan view which shows a truck-mounted brake assembly having a conventional prior art handwheel hand brake or parking brake, as described above, and is accordingly labeled "Prior Art".

Referring to FIG. 4, a currently used hand brake mechanism, generally designated as 40, on a truck-mounted brake assembly is shown. The hand brake mechanism 40 includes a housing, generally designated as 42, which includes a back plate or wall portion 44, mountable on a railway car, and a cover member 46. The cover member 46 is secured to the back wall portion 44.

A chain 48, for both application and release of the brakes, is connected, as is conventional practice in the railroad industry, to the brake rigging via a hand brake lever 50. Such chain 48 is both attached to and wound on a winding drum 52. The hand brake lever 50 is, in turn, connected to an air cylinder force transfer lever 14.

In order to apply the brakes, a hand wheel 54 is rotated in a clockwise direction to wind the chain 48 about the winding drum 52 and to cause the hand brake lever 50 to be pulled in an outward direction away from the brake rigging 10. This causes the force transfer lever 14 to be rotated in a counterclockwise direction resulting in the piston push rod 38 being pulled in an outward direction and the required force being applied to the slack adjuster assembly 28. This force acts in a manner that is similar to the force which is applied by the brake cylinder piston and piston rod of the air cylinder assembly 20 when such is pressurized.

The present invention would replace this manually actuated hand wheel/chain/hand brake lever system with a spring applied/air released parking brake assembly. The spring applied/air released parking brake assembly of the present invention is automatically activated when the car has been removed from the train and the pneumatic braking system used for activating the above discussed truck mounted braking system has been disconnected. once the car has been reconnected with the train and the pneumatic braking system is again in effect, the spring applied parking brake assembly of the invention is released.

Referring again to FIG. 1, the spring applied parking brake assembly, generally designated as 60, is preferably mounted onto the brake beam assembly 3 at the non-brake cylinder end of the braking system alongside of the return push rod assembly 32. This location enables the spring applied parking brake assembly 60 to apply a force to the non-cylinder force transfer lever 16 to cause rotation of this force transfer lever in a counterclockwise direction to apply the brakes and in a clockwise direction, upon the application of pneumatic pressure within the spring applied parking brake 60, to release the brakes. Although the drawings show the spring applied parking brake assembly 60 mounted to the brake beam 3, other mounting locations may be utilized as long as such locations can sufficiently support the spring applied parking brake assembly 60 and ensure that such spring applied parking brake assembly 60 is capable of applying a force to cause rotation in the desired direction of the non-cylinder transfer lever 16. The spring applied parking brake 60 of the invention may be mounted to the braking system by any well known means such as a bolt/nut arrangement or the like.

Figures 2, 3:
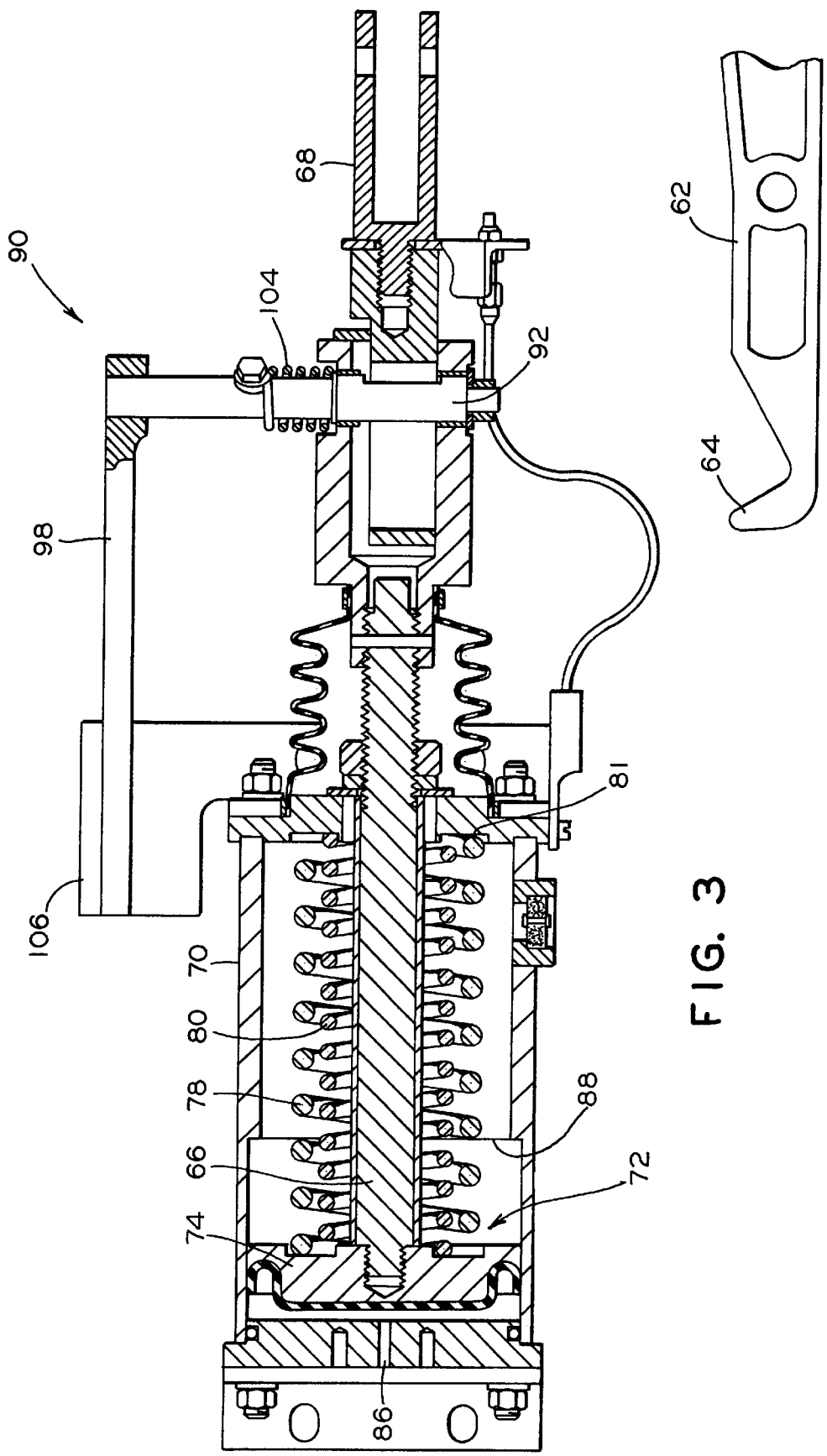
FIG. 2 is an enlarged view of the hook end of the non-cylinder force transfer lever of the truck-mounted brake assembly.
FIG. 3 is a cross-sectional view of the spring applied parking brake of the invention.

The non-cylinder transfer lever 16 includes an extension means 62 which extends beyond the connection point 36 of the return push rod assembly 32. This extension means 62 creates a longer non-cylinder transfer lever than is currently used in the typical truck mounted braking systems. A hook 64, as shown in FIG. 2, is provided at the end of the extension means 62 to enable attachment of the piston rod 66, specifically a piston pull rod, to the non-cylinder transfer lever 16 via attachment means 68, as illustrated in FIG. 3. This hook 62 facilitates movement of the non-cylinder transfer lever 16 to a brake applied position.

The spring applied brake assembly, as illustrated in FIG. 3 comprises a cylindrical casing 70 which is engaged with the railroad vehicle braking system. A piston assembly, generally designated as 72, is mounted for longitudinal movement within the cylindrical casing 70. The piston assembly includes a piston 74 and a piston pull/push rod 66. An attachment means 68, preferably in the form of a clevis end, is disposed on the piston rod 66 for associating the piston assembly 72 with the non-cylinder force transfer lever 16 so as to apply a force to this non-cylinder force transfer lever 16 upon longitudinal movement of the piston assembly 72. At least one spring member 78 is provided within the cylindrical casing 70. Preferably a second spring member 80 is provided within the cylindrical casing 70. These spring members have a first end 81 which abuts against an end wall 83 of the cylindrical casing 70 and a second end 82 which contact the piston 74 and apply a force thereto causing automatic longitudinal movement of the piston assembly 72 upon removal of pneumatic pressure to the braking system and the piston assembly 72. This constantly applied force from the spring members 78, 80 to a second side of the piston assembly 72 causes the piston assembly 72 to retract within the casing 70 and the force transfer lever to rotate in a counterclockwise direction to cause an application of the brakes to the braking system. Thus, once the train is removed from the train consist and the air supply for the pneumatic braking system has been disconnected, the brakes of the train are automatically applied.

At least one opening 86 is provided within the cylindrical casing to enable the application of pneumatic pressure to a first side of the piston assembly 72 to cause this piston assembly 72 to move in a longitudinal direction to compress the springs 78, 80 and to drive the piston rod 66 out of the cylindrical casing to cause the non-cylinder force transfer lever 16 to rotate in a clockwise direction to cause a release of the brakes. A piston stop means 88 is provided within the cylindrical casing 70 for limiting forward movement of the piston 74 upon the application of pneumatic pressure within the cylindrical casing 70.

At least one opening 86 is provided within the cylindrical casing to enable the application of pneumatic pressure to the piston assembly 72 to cause this piston assembly 72 to move in a longitudinal direction to compress the springs 78, 80 and to drive the piston rod 66 out of the cylindrical casing to cause the non-cylinder force transfer lever 16 to rotate in a clockwise direction to cause a release of the brakes. A piston stop means 88 is provided within the cylindrical casing 70 for limiting forward movement of the piston 74 upon the application of pneumatic pressure within the cylindrical casing 70.

Although the above description is directed to the use of the inventive spring applied parking brake with respect to a truck mounted braking system, the spring applied parking brake of the invention is also applicable to car mounted braking systems.

Figure 6:
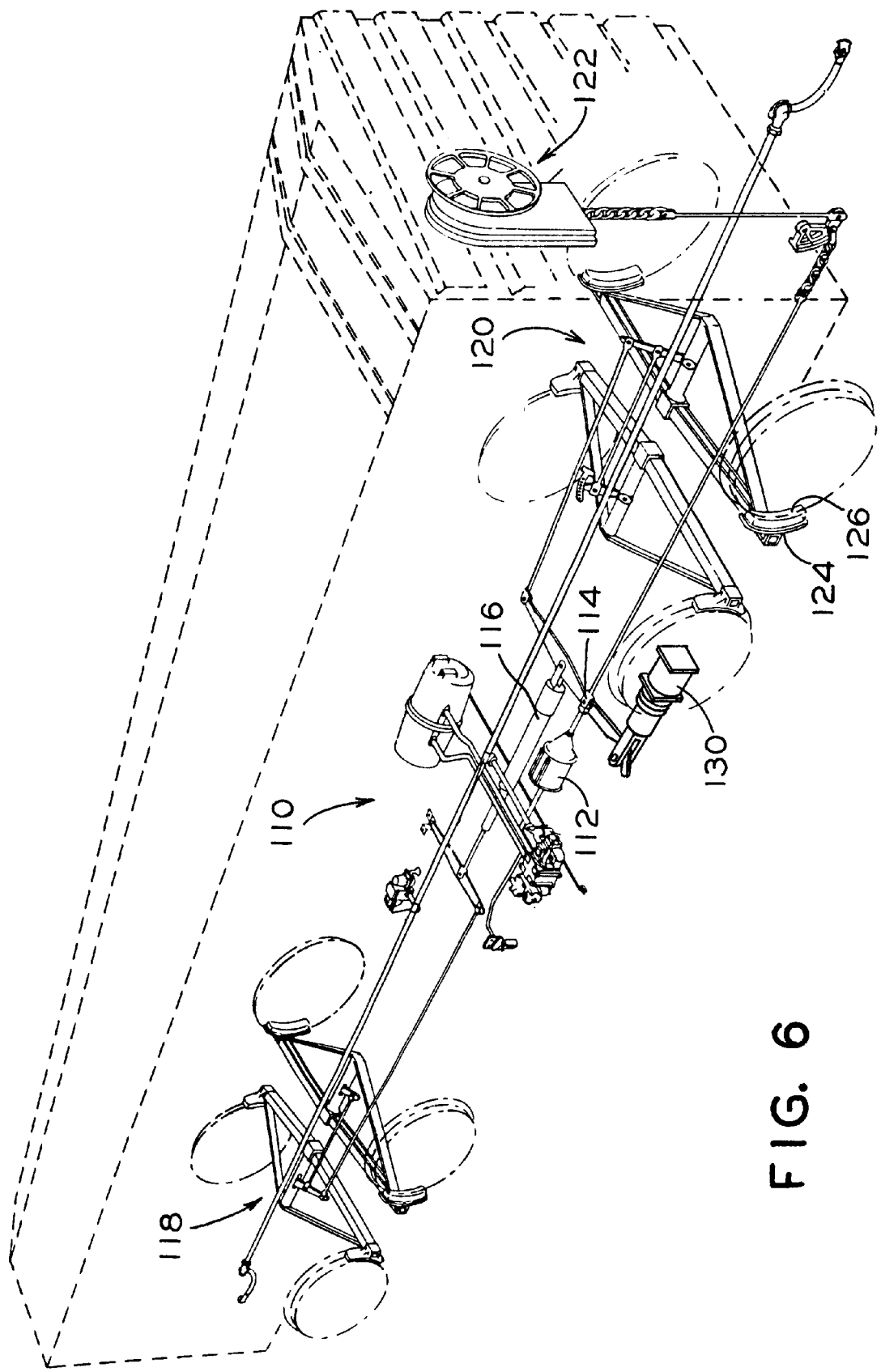
FIG. 6 is a plan view which shows a car mounted brake assembly including the spring applied parking brake of the invention.

Referring now to FIG. 6, there is shown a car mounted brake assembly, generally designated 110, for a railway vehicle (not shown). The car mounted brake assembly 110 includes a brake cylinder 112, associated with a cylinder force transfer lever 114, a slack adjuster 116, also associated with the cylinder force transfer lever 114, and a pair of brake beams, generally designated 118 and 120 mounted at each end of the car mounted brake assembly 110. A hand brake or parking brake 122, is also provided which is associated with the cylinder force transfer lever 114. The brake beams 118, 120 are actuated by the brake cylinder 112 or the hand brake 122, via the cylinder force transfer lever 114 and a series of additional levers and linkages. Brake levers are used throughout the braking system to transmit, increase, or decrease braking force, as well as to transfer or change direction of force. Thus, during a braking situation wherein a force is applied by the brake cylinder 112 or the hand brake 122, these levers and rods transmit and deliver braking forces to the brake beams 118 and 120 and, consequently, to the brake heads 124 and brake shoes 126 mounted thereon.

The spring applied parking brake 130 is associated with the cylinder force transfer lever 114 extending in an opposite direction from the brake cylinder 112 such that upon a release of the braking system from the pneumatic braking system, the spring applied parking brake 130 automatically becomes activated and applies a force to the cylinder force transfer lever 114 in a similar manner as either the brake cylinder 112 and/or the hand brake 122 so as rotate the cylinder force transfer lever 114 to initiate a braking sequence.

Figure 5:
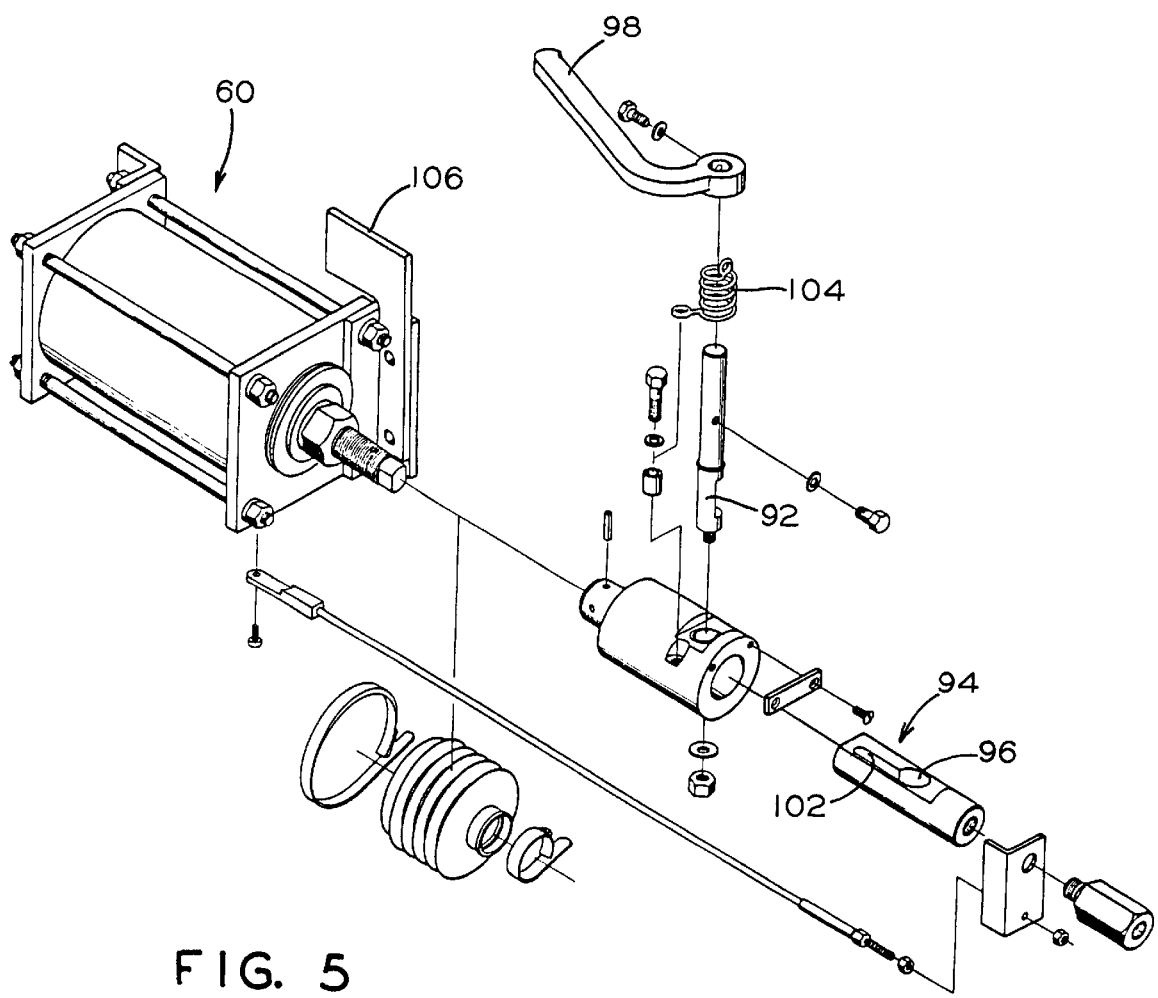
FIG. 5 is an expanded view of the quick release handle portion of the spring applied parking brake of the invention.

The spring applied parking brake of the invention also includes a manual quick release system, generally designated as 90, which allows the parking brake to be released during shunting operations or anytime that it is desirable to move the vehicle when in the absence of air pressure from the pneumatic braking system. As illustrated in FIGS. 3 and 5, this manual quick release system is located on the piston rod end of the piston assembly 72 and comprises a half-moon shaped cam 92 operating in a keyhole shaped slot 94. This half-moon cam 92 lies crosswise in the circular end 96 of the keyhole 94 during normal operations. A handle 98 is attached to the cam 92 and is manually operated to effect a quick release by rotating the cam 92 so that it aligns with the elongated portion 102 of the keyhole shaped slot 94. The force of the spring members 78, 80 draw the cam 92 into the elongated portion 102 of the slot 94. This longitudinal movement of the cam 92 in a first direction into the elongated portion 102 of slot 94 releases the force applied by the parking brake 60 on the non-cylinder transfer lever 16 and consequently causes a release of the parking brake.

The parking brake will remain in a released position, with the handle pulled out, until a normal air pressure actuated brake release is made. When this occurs, the piston assembly 72 will move to compress the spring members 78, 80 and move the cam 92 forward, or in a second direction into the slot 94. As the cam enters the circular end 96 of the keyhole shaped slot 94, a torsion spring 104 on the cam shaft will rotate the cam 92 so that it again lies crosswise in the keyhole 94. As this occurs, the handle 98 rotates clockwise and impacts a striker plate 106 attached to the front mounting foot of the parking brake 60. Once the handle 98 has returned to its normal position, the spring applied parking brake is reset for normal operation. Should a situation occur where no air is available to reset the parking brake, the manually activated hand wheel hand brake 40 (FIG. 4) may be used to apply the parking brake.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

We claim:

1. A spring applied parking brake assembly for a railroad vehicle braking system, such railroad vehicle braking system including a force transfer lever associated with at least one force transmitting member for initiating a brake application, said spring applied parking brake assembly comprising:

(a) a housing including a means for one of applying and removing pneumatic pressure therein;

(b) a piston assembly mounted for longitudinal movement within said housing, said piston assembly capable of longitudinal movement upon one of an application and removal of pneumatic pressure to a first side of said piston assembly, said piston assembly including a piston and a piston rod;

(c) an extension means associated with an end of such force transfer lever;

(d) attachment means disposed on said piston rod for associating said piston assembly with said extension means so as to apply a force to said extension means and consequently to such force transfer lever upon longitudinal movement of said piston assembly; and (e) at least one spring member caged between an inside end surface of said housing and a facing surface of said piston, said spring member being capable of applying a force to a second side of said piston assembly to achieve longitudinal movement of said piston assembly upon removal of pneumatic pressure to said piston assembly to cause said piston assembly to retract within said housing and cause such force transfer lever to rotate in a direction to initiate a brake application in such railroad vehicle braking system.

2. A spring applied parking brake assembly as recited in claim 1 including openings in said housing to enable application of pneumatic pressure to said piston assembly to cause said piston assembly to move in a longitudinal direction to compress said at least one spring and to drive said piston rod out of said housing to cause said force transfer lever to rotate in a direction to cause a release of brakes in such railroad vehicle braking system.

3. A spring applied parking brake assembly as recited in claim 1 including a piston stop means within said housing for limiting forward movement of said piston upon application of pneumatic pressure within said housing.

4. A spring applied parking brake assembly as recited in claim 1 including at least two spring members for applying a force to said piston assembly to achieve movement of said piston assembly upon removal of pneumatic pressure to said piston assembly to cause said piston assembly to retract within said housing.

5. A spring applied parking brake assembly as recited in claim 1 wherein such railroad vehicle braking system includes at least one brake beam assembly and wherein said housing is mounted to said at least one brake beam assembly.

6. A spring applied parking brake assembly as recited in claim 1 including a handle and cam arrangement associated with said piston rod for manual quick release of said parking brake assembly.

7. A spring applied parking brake assembly as recited in claim 1 including a hook on an end of said extension means to allow for connection of said attachment means thereto.

8. A spring applied parking brake assembly as recited in claim 1 wherein said spring applied parking brake assembly includes a manual quick release handle.

9. A spring applied parking brake assembly as recited in claim 8 wherein said manual quick release handle is attached to a half moon shaped cam which is positioned within a keyhole shaped slot.

10. A spring applied parking brake assembly as recited in claim 9 wherein said half moon shaped cam is capable of longitudinal movement in a first direction within said keyhole shaped slot upon rotational movement of said manual quick release handle to cause a quick release of said spring applied parking brake assembly.

11. A spring applied parking brake assembly as recited in claim 10 wherein said manual quick release handle includes a torsion spring on said cam to cause said cam to rotate to an initial position within said keyhole shaped slot after an application of pneumatic pressure within said spring applied parking brake assembly causes longitudinal movement in a second direction of said moon shaped cam.

12. A spring applied parking brake assembly as recited in claim 11 including a striker plate mounted on said spring applied parking brake assembly for stopping rotational movement of said manual quick release handle after application of pneumatic pressure within said spring applied parking brake assembly to reset said spring applied parking brake assembly.

13. A spring applied parking brake assembly as recited in claim 1 wherein such railroad vehicle braking system is a truck mounted braking system and such force transfer lever is a non-cylinder force transfer lever.

14. A spring applied parking brake assembly as recited in claim 1 wherein such railroad vehicle braking system is a car mounted braking system and such force transfer lever is a cylinder force transfer lever.

15. A manual quick release system for a spring applied parking brake, such spring applied parking brake being associated with one of a non-cylinder and cylinder force transfer lever of a railroad vehicle braking system, such spring applied parking brake including a piston assembly having a piston and a piston rod and at least one spring member associated with said piston assembly and being capable of applying a force to such piston assembly to achieve longitudinal movement of such piston, said manual quick release system comprising:

(a) a carrier member engageable with such piston rod;

(b) a bar member positioned within said carrier member;

(c) a keyhole shaped slot in said bar member, said keyhole shaped slot having a circular end and an elongated portion;

(d) a half-moon shaped cam engageable in a crosswise direction within said circular end of said keyhole shaped slot; and (e) a handle attached to said half-moon shaped cam such that rotation of said handle along with such force applied by such at least one spring member of such spring applied brake assembly causes said cam to move into said elongated portion of said keyhole shaped slot thereby releasing the force applied by such spring applied parking brake to such non-cylinder force transfer lever and consequently causing a quick release of such spring applied parking brake on such railroad vehicle.

16. A manual quick release system as recited in claim 15 including a torsion spring for rotating said half-moon shaped cam to an initial crosswise direction within said keyhole shaped slot upon compression of said at least one spring member and entrance of said half-moon shaped cam within said keyhole shaped slot.

17. A manual quick release system as recited in claim 15 including a striker plate for stopping rotational movement of said manual quick release handle upon rotation thereof to an initial position, said striker plate capable of being attached to a front mounting foot of such parking brake.

* * * * *